(12) United States Patent
Li et al.

(10) Patent No.: US 11,247,331 B2
(45) Date of Patent: Feb. 15, 2022

(54) STATIC COMPLIANCE PERFORMANCE TESTING DEVICE APPLIED TO INDUSTRIAL ROBOT (71) Applicant: China Electronic Product Reliability and Environmental Testing Research Institute ((The Fifth Electronic Institute of MIIT) (CHINA CEPREI LABORATORY)), Guangzhou (CN)

(72) Inventors: Xiaobing Li, Guangzhou (CN); Wenwei Liu, Guangzhou (CN); Chengju Dong, Guangzhou (CN); Yuanhang Wang, Guangzhou (CN); Bochen Chen, Guangzhou (CN); Keqiang Cheng, Guangzhou (CN); Jianfeng Yang, Guangzhou (CN); Qiang Huang, Guangzhou (CN)

(73) Assignee: CHINA ELECTRONIC PRODUCT RELIABILITY AND ENVIRONMENTAL TESTING RESEARCH INSTITUTE((THE FIFTH ELECTRONIC INSTITUTE OF MIIT) (CHINA CEPREI LABORATORY))

( * ) Notice: Subject to any disclaimer, the term of this patent is extended or adjusted under 35 U.S.C. 154(b) by 211 days.

(21) Appl. No.: 16/797,121

(22) Filed: Feb. 21, 2020

(65) Prior Publication Data
US 2020/0282556 A1 Sep. 10, 2020

(51) Int. Cl.
*B25J 9/00* (2006.01)
*B25J 9/16* (2006.01)
(Continued)

(52) U.S. Cl.
CPC ............. *B25J 9/1633* (2013.01); *B25J 9/023* (2013.01); *B25J 9/1045* (2013.01); *B25J 9/161* (2013.01);
(Continued)

(58) Field of Classification Search
CPC . B25J 9/023; B25J 9/1045; B25J 9/161; B25J 9/1633; B25J 9/1694; B25J 13/085;
(Continued)

(56) References Cited

FOREIGN PATENT DOCUMENTS

| CN | 108548685 A | * | 9/2018 |
| CN | 208333826 U | * | 1/2019 |
| CN | 208812141 U | * | 5/2019 |

* cited by examiner

Primary Examiner — Dale Moyer
(74) Attorney, Agent, or Firm — IP Attorneys Group (57) ABSTRACT

The present invention relates to a static compliance performance testing device applied to an industrial robot, comprising a loading direction adjusting component and a loading force adjusting component, wherein the force applying end of the loading direction adjusting component is connected with an end mechanical interface of the industrial robot, and is configured to adjust a force bearing direction of the end mechanical interface. The loading force adjusting component comprises a lever, a first-stage weight and a second-stage weight, the lever is provided with a fixing part and is rotatable around the fixing part, the force bearing end of the loading direction adjusting component is connected with the lever, the first-stage weight is suspended on the lever, the second-stage weight is suspended on the lever and is movable along the lever, the weight of the first-stage weight is larger than the weight of the second-stage weight.

20 Claims, 7 Drawing Sheets

(51) Int. Cl.
   *B25J 9/10*      (2006.01)
   *B25J 9/02*      (2006.01)
   *B25J 19/02*     (2006.01)
   *B25J 13/08*     (2006.01)

(52) U.S. Cl.
   CPC ........... *B25J 9/1694* (2013.01); *B25J 13/085* (2013.01); *B25J 19/022* (2013.01)

(58) Field of Classification Search
   CPC .... B25J 19/0095; B25J 19/022; B25J 9/1697; B25J 9/1692
   See application file for complete search history.

STATIC COMPLIANCE PERFORMANCE TESTING DEVICE APPLIED TO INDUSTRIAL ROBOT

TECHNICAL FIELD

The present invention relates to the technical field of industrial robot performance testing, in particular to a static compliance performance testing device applied to an industrial robot.

BACKGROUND

In recent years, the industrial robot industry has developed rapidly, and the industrial scale and the market space have also expanded. Industrial robots, as the key supporting device for the advanced manufacturing industry, are an important benchmark for measuring the manufacturing level and technological strength of a country or region. The static compliance performance test of an industrial robot is an important part of the performance test of an industrial robot. Static compliance refers to the maximum displacement per unit load acting on the end mechanical interface of an industrial robot. However, most of the static compliance performance testing devices of traditional industrial robots have complicated structures and are expensive, which makes it difficult to meet the needs of actual production.

SUMMARY

Based on this, it is necessary to provide a static compliance performance testing device applied to an industrial robot. The static compliance performance testing device applied to an industrial robot has a simple structure, low cost, and convenient operation.

A static compliance performance testing device applied to an industrial robot comprises:

a loading direction adjusting component, the force applying end of which is connected with an end mechanical interface of the industrial robot and is configured to adjust a force bearing direction of the end mechanical interface of the industrial robot; and a loading force adjusting component, comprising a lever, a first-stage weight and a second-stage weight, wherein the lever is provided with a fixing part and is rotatable around the fixing part, the force bearing end of the loading direction adjusting component is connected with the lever, the first-stage weight is suspended on the lever, the second-stage weight is suspended on the lever and is movable along the lever, the weight of the first-stage weight is larger than the weight of the second-stage weight, and the first-stage weight and the second-stage weight are both located on one side of the force bearing end of the loading direction adjusting component.

The static compliance performance testing device applied to an industrial robot described above can adjust the force bearing direction of the end mechanical interface of the industrial robot by the loading direction adjusting component. The loading force adjusting component can adjust the force bearing magnitude of the end mechanical interface of the industrial robot, thereby controlling the force bearing magnitude of the end mechanical port of the industrial robot. The loading force adjusting component mainly adjusts the magnitude of the loading force through a first-stage weight and a second-stage weight on a lever connected with the force bearing end of the loading direction adjusting component. The weight of the first-stage weight is greater than that of the second-stage weight. The loading force can be adjusted initially by increasing or decreasing the number of the first-stage weights, and the loading force can be further precisely adjusted by increasing or decreasing the number of the second-stage weights or changing the position of the second-stage weight on the lever. The static compliance performance testing device applied to an industrial robot has a simple structure and low cost, and controls the loading force without using a complex servo motor or an oil cylinder. In addition, the static compliance performance testing device applied to an industrial robot is more convenient to operate when adjusting the direction and magnitude of the loading force.

In one embodiment, the static compliance performance testing device applied to an industrial robot further comprises an end loading cubic head, wherein the end loading cubic head is fixed at the end mechanical interface of the robot, and the force applying end of the loading direction adjusting component is connected with the end loading cubic head and is configured to adjust the force bearing direction of the end loading cubic head.

In one embodiment, the loading force adjusting component further comprises a third-stage weight, the third-stage weight is sleeved on the lever and is movable along the lever, the weight of the third-stage weight is smaller than that of the second-stage weight, and the first-stage weight, the second-stage weight, and the third-stage weight are all located on one side of the force bearing end of the loading direction adjusting component.

In one embodiment, the loading direction adjusting component comprises a traction rope and a fixed pulley group, the fixed pulley group comprises at least four fixed pulleys, one end of the traction rope is connected with the end mechanical interface of the industrial robot, and the other end of the traction rope is connected with the lever by bypassing the fixed pulley or the other end of the traction rope is directly connected with the lever, and the force bearing direction of the end mechanical interface of the industrial robot is changeable by changing the fixing position of the fixed pulley.

In one embodiment, an xyz coordinate system is established with a geometric center of an end mechanical interface of the industrial robot as an origin, the fixed pulley group comprises six fixed pulleys, which are the first fixed pulley, the second fixed pulley, the third fixed pulley, the fourth fixed pulley, the fifth fixed pulley, and the sixth fixed pulley, respectively, the center line connecting the first fixed pulley and the second fixed pulley is parallel to the z axis and located in a plane defined by the z axis and the y axis; the center line connecting the third fixed pulley and the fourth fixed pulley is parallel to the z axis and located in a plane defined by the z axis and the x axis; the fifth fixed pulley and the sixth fixed pulley are both tangent to the z axis and are located on both sides of the end mechanical interface of the industrial robot, respectively, or the fifth fixed pulley and the sixth fixed pulley are both located below the end mechanical interface of the industrial robot and the fifth fixed pulley and the sixth fixed pulley are both tangent to the negative direction of the z axis.

In one embodiment, the static compliance performance testing applied to an industrial robot further comprises a tension sensor and a displacement sensor, wherein the tension sensor is configured to detect the tension received by the force bearing end of the loading direction adjusting component, and the displacement sensor is configured to detect the displacement of the end mechanical interface of the industrial robot.

In one embodiment, the displacement sensor is a laser tracking sensor, the laser tracking sensor comprises a laser tracker and a laser target, and the laser target is provided on the end mechanical interface of the industrial robot, and the laser tracker is configured to track and collect the displacement information of the laser target in real time.

In one embodiment, the static compliance performance testing device applied to an industrial robot further comprises a data analyzer, wherein the data analyzer is electrically connected with the tension sensor and the displacement sensor, and the data analyzer obtains the static compliance performance of the industrial robot through calculation and analysis by receiving the detection result of the tension sensor and the displacement sensor.

In one embodiment, the static compliance performance testing device applied to an industrial robot further comprises a tension data acquisition instrument, wherein the tension data acquisition instrument is electrically connected with the tension sensor and the data analyzer, and the tension data acquisition instrument is configured to collect the detection result of the tension sensor and transmit the detection result of the tension sensor to the data analyzer.

In one embodiment, the static compliance performance testing device applied to an industrial robot further comprises a displacement sensing controller, wherein the displacement sensing controller is electrically connected with the displacement sensor and the data analyzer, the displacement sensor controller is configured to control the operation of the displacement sensor, and the displacement sensor controller is further configured to collect the detection result of the displacement sensor and transmit the detection result of the displacement sensor to the data analyzer.

DESCRIPTION OF THE EMBODIMENTS

To make the objects, technical solutions, and advantages of the present invention clearer, the present invention will be further described in detail with reference to the accompanying drawings and specific embodiments hereinafter. It should be understood that the specific embodiments described herein are only used to explain the present invention, rather than limit the protection scope of the present invention.

It should be noted that when an element is referred to as being "fixed to" another element, it may be directly on another element or an intervening element may also be present. When an element is considered to be "connected to" another element, it can be directly connected to another element or an intervening element may also be present. The terms "vertical", "horizontal", "left", "right" and similar expressions used herein are for illustrative purposes only and are not meant to be the only implementations.

Unless defined otherwise, all technical and scientific terms used herein have the same meaning as commonly understood by one of ordinary skill in the art to which the present invention belongs. The terms used herein in the description of the present invention are only for the purpose of describing specific embodiments, and are not intended to limit the present invention. The term "and/or" as used herein comprises any and all combinations of one or more of the associated listed items.

Figure 1:
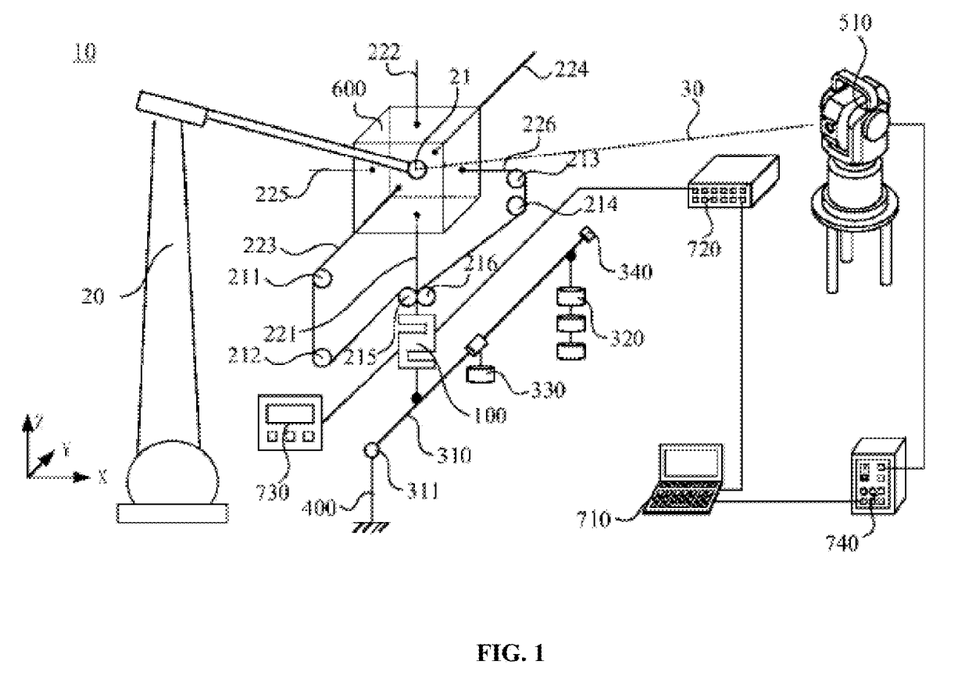
FIG. 1 is a schematic structural diagram of a static compliance performance testing device applied to an industrial robot according to an embodiment of the present invention.

As shown in FIG. 1, an embodiment of the present invention provides a static compliance performance testing device 10 (hereinafter referred to as the static compliance performance testing device 10), which comprises a loading direction adjusting component and a loading force adjusting component. The static compliance performance testing device 10 has a simple structure, low cost, and convenient operation.

Specifically, the force applying end of the loading direction adjusting component is connected with an end mechanical interface 21 of the industrial robot 20 and is configured to adjust a force bearing direction of the end mechanical interface 21 of the industrial robot 20. Optionally, the loading direction adjusting component comprises a traction rope and a fixed pulley group, and the fixed pulley group comprises at least four fixed pulleys. In the present embodiment, the traction rope is a steel wire rope. The steel wire rope has increased toughness and is not easily damaged during the test.

In the present embodiment, an xyz coordinate system is established with a geometric center of an end mechanical interface 21 of the industrial robot 20 as an origin. The fixed pulley group comprises six fixed pulleys, which are the first fixed pulley 211, the second fixed pulley 212, the third fixed pulley 213, the fourth fixed pulley 214, the fifth fixed pulley 215, and the sixth fixed pulley 216, respectively, the center line connecting the first fixed pulley 211 and the second fixed pulley 212 is parallel to the z axis and located in a plane defined by the z axis and the y axis; the center line connecting the third fixed pulley 213 and the fourth fixed pulley 214 is parallel to the z axis and located in a plane defined by the z axis and the x axis; the fifth fixed pulley 215 and the sixth fixed pulley 216 are both tangent to the z axis and are located on both sides of the end mechanical interface 21 of the industrial robot 20, respectively, or the fifth fixed pulley 215 and the sixth fixed pulley 216 are both located below the end mechanical interface 21 of the industrial robot 20 and the fifth fixed pulley 215 and the sixth fixed pulley 216 are both tangent to the negative direction of the z axis.

Specifically, as shown in FIG. 1, the loading force adjusting component comprises a lever 310, a first-stage weight 320, and a second-stage weight 330. The lever 310 is provided with a fixing part 311 and is rotatable around the fixing part 311. The force bearing end of the loading direction adjusting component is connected with the lever 310, the first-stage weight 320 is suspended on the lever 310, the second-stage weight 330 is suspended on the lever 310 and is movable along the lever 310, the weight of the first-stage weight 320 is larger than the weight of the second-stage weight 330, and the first-stage weight 320 and the second-stage weight 330 are both located on one side of the force bearing end of the loading direction adjusting component. In the present embodiment, a scale is provided on the lever 310 to facilitate adjustment of the moving distance of the second-stage weight 330.

Specifically, one end of the traction rope is connected with the end mechanical interface 21 of the industrial robot 20, and the other end of the traction rope is connected with the lever 310 by bypassing the fixed pulley or the other end of the traction rope is directly connected with the lever 310, and the force bearing direction of the end mechanical interface 21 of the industrial robot 20 is changeable by changing the fixing position of the fixed pulley. The configuration is simple in structure and low in cost. By changing the fixing position of the fixed pulley and the bypassing method of the traction rope, the force bearing direction of the end mechanical interface 21 of the industrial robot 20 can be changed. It is simple in operation, time-saving and labor-saving.

Further, the static compliance performance testing device 10 further comprises a fixing base 400, and the fixing part 311 of the lever 310 is rotatably fixed on the fixing base 400. In the present embodiment, the fixing part 311 of the lever 310 is hinged to the fixing base 400. This configuration can change the force bearing magnitude of the force bearing end of the loading direction adjusting component by adjusting the weights of each stage. Specifically, the end mechanical interface 21 of the industrial robot 20 is located above the lever 310, and the force bearing end of the loading direction adjusting component, the first-stage weight 320 and the second-stage weight 330 are all located on one side of the fixing part 311. In the present embodiment, the first-stage weight 320 and the second-stage weight 330 are both located on one side of the force bearing end of the loading direction adjusting component, and the fixing part 311 is located on the other side of the force bearing end of the loading direction adjusting component. According to the principle of the lever 310, $F1 \times L1 = F2 \times L2$ (F1 represents the gravity of the first-stage weight 320 and the second-stage weight 330, F2 represents the loading force received by the force bearing end of the load direction adjusting component, L1 represents the distance from the first-stage weight 320 and the second-stage weight 330 to the fixing part 311, and L2 represents the distance from the force bearing end of the load direction adjusting component to the fixing part 311). Since L1 is greater than L2, F1 is less than F2. Therefore, a relatively large change in the loading force of the end mechanical interface 21 of the industrial robot 20 can be achieved by a weight of smaller mass.

In other embodiments, the end mechanical interface 21 of the industrial robot 20 may be located below the lever 310, the force bearing end of the loading direction adjusting component may be located on one side of the fixing part 311, and the first-stage weight 320 and the second-stage weight 330 are both located on the other side of the fixing part 311. The above configurations are all helpful to form a stable lever system, so that the force bearing magnitude of the force bearing end of the load direction adjusting component can be changed by adjusting the weights of various stages.

In the present embodiment, the fixing base 400 is fixed on the ground. Of course, in other embodiments, the fixing base 400 may also be vertically (it can be understood that vertically here does not only mean absolute vertically, but a certain error should be allowed to exist, as long as the purpose can be achieved, all of which fall within the protection scope) fixed on a vertical wall surface or provided in other manners, as long as the lever 310 can be rotated around the fixing part 311.

Further, the loading force adjusting component further comprises a third-stage weight 340, the third-stage weight 340 is sleeved on the lever 310 and is movable along the lever 310, the weight of the third-stage weight 340 is smaller than that of the second-stage weight 330, and the first-stage weight 320, the second-stage weight 330, and the third-stage weight 340 are all located on one side of the force bearing end of the loading direction adjusting component. Since the weight of the third-stage weight 340 is less than the weight of the second-stage weight 330 and the third-stage weight 340 is sleeved on the lever 310, the loading force can be more precisely adjusted by adjusting the position of the third-stage weight 340 on the lever 310 so as to more accurately measure the static compliance performance of the industrial robot 20. In the present embodiment, the third-stage weight 340 is in threaded-connection with the lever 310, thereby facilitating the precise control of the movement of the third-stage weight 340 on the lever 310 to achieve the precise control of the magnitude of the loading force. Specifically, the third-stage weight 340 is located at an end of the lever 310 away from the fixing base 400, so that a relatively large change in the loading force of the end mechanical interface 21 of the industrial robot 20 can be achieved by the third-stage weight 340 of smaller mass.

In this way, the configuration of the first-stage weight 320, the second-stage weight 330, and the third-stage weight 340 enables the static compliance performance testing device 10 to meet the requirement that the required rated loading force has a large adjustment range (approximately 3 kg to 1000 kg, such as 3 kg, 6 kg, 20 kg, 250 kg, etc.) and a high adjustment accuracy (10% of the rated loading force gradually increases to 100% of the rated loading force at the growing rate of 10%) in the static compliance performance testing of the industrial robot 20.

Specifically, the connecting end of the lever 310 and the traction rope is located in the negative direction of the y axis. There are six traction ropes: the traction rope 221 loaded in the negative direction of the z axis, the traction rope 222 loaded in the positive direction of the z axis, the traction rope 223 loaded in the negative direction of the y axis, the traction rope 224 loaded in the positive direction of the y axis, the traction rope 225 loaded in the negative direction of the x axis, and the traction rope 226 loaded in the positive direction of the x axis.

Figure 2:
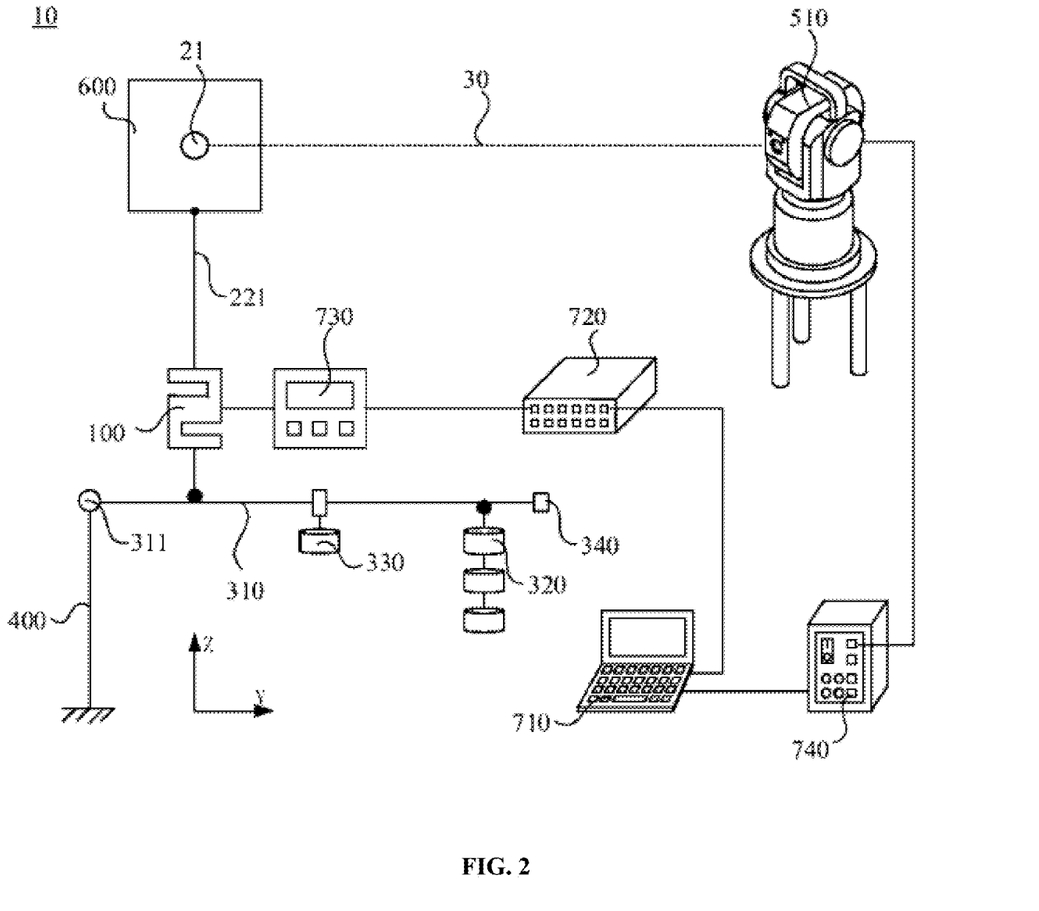
FIG. 2 is a schematic diagram when the static compliance performance testing device applied to an industrial robot shown in FIG. 1 is configured to test the static compliance performance in the negative direction of the z axis of the end mechanical interface.

When testing the static compliance performance in the negative direction of the z axis of the end mechanical interface 21 of the industrial robot 20, as shown in FIG. 2, one end of the traction rope 221 loaded in the negative direction of the z axis is connected with the end mechanical interface 21 of the industrial robot 20, and the other end of the traction rope 221 loaded in the negative direction of the z axis is directly connected with the lever 310 for measurement.

Figure 3:
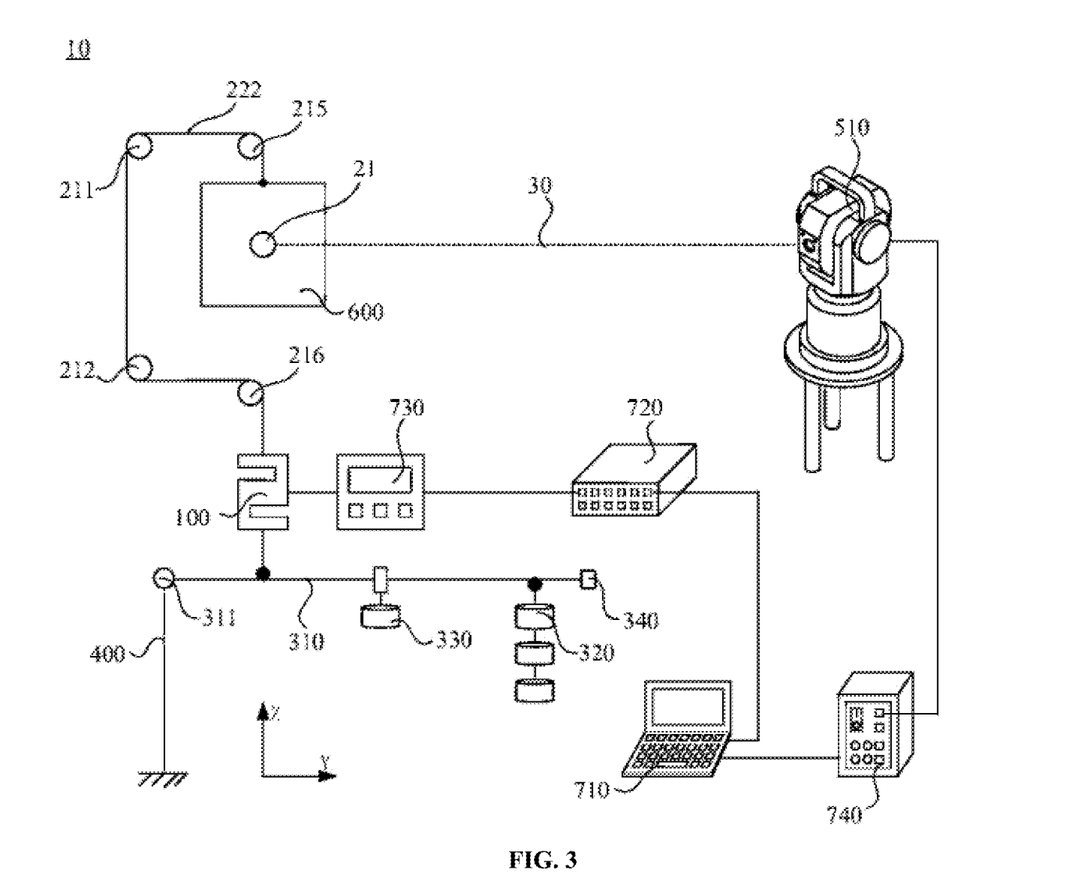
FIG. 3 is a schematic diagram when the static compliance performance testing applied to an industrial robot shown in FIG. 1 is configured to test the static compliance performance in the positive direction of the z axis of the end mechanical interface.

When testing the static compliance performance in the positive direction of the z axis of the end mechanical interface 21 of the industrial robot 20, as shown in FIG. 3, the fifth fixed pulley 215 is tangent to the positive direction of the z axis and is located on one side of the z axis close to the first fixed pulley 211. The sixth fixed pulley 216 is tangent to the negative direction of the z axis and is located on one side of the z axis close to the second fixed pulley 212. The center line connecting the first fixed pulley 211 and the fifth fixed pulley 215 is parallel to the center line connecting the second fixed pulley 212 and the sixth fixed pulley 216. One end of the traction rope 222 loaded in the positive direction of the z axis is connected with the end mechanical interface 21 of the industrial robot 20, and the other end of the traction rope 222 loaded in the positive direction of the z axis is connected with the lever 310 by bypassing the top of the fifth fixed pulley 215, the top of the first fixed pulley 211, the bottom of the second fixed pulley 212, and the top of the sixth fixed pulley 216 in order.

Figure 4:
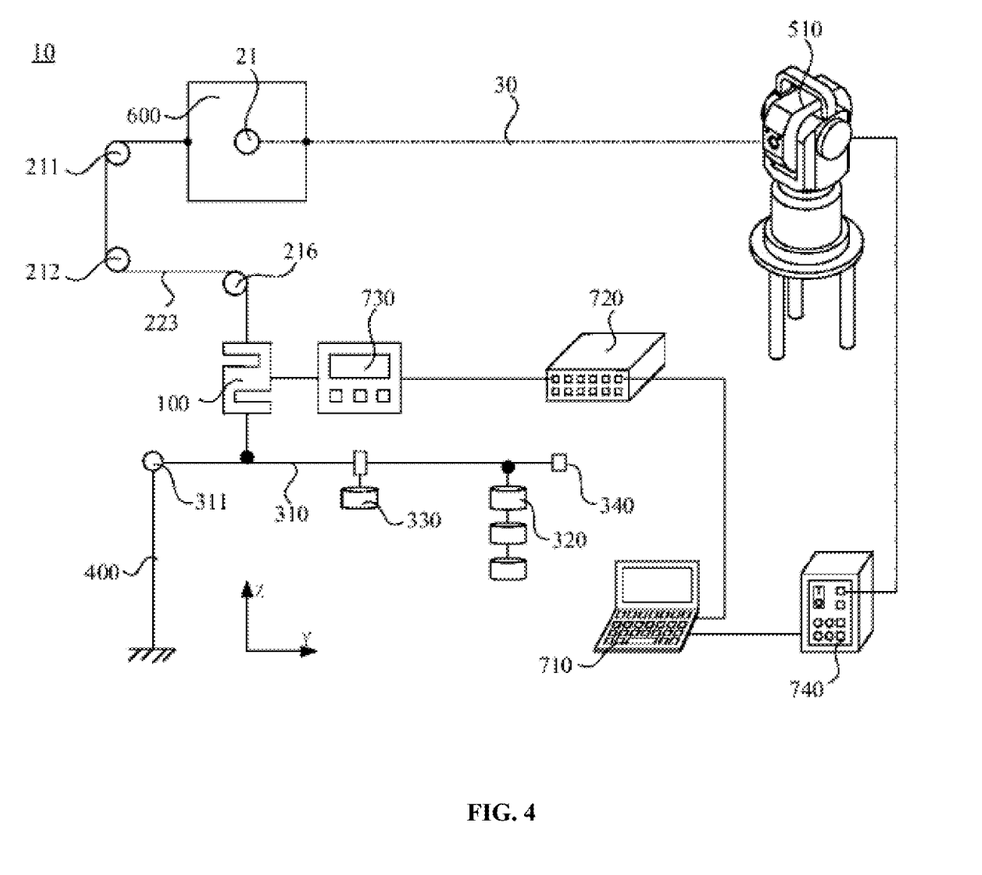
FIG. 4 is a schematic diagram when the static compliance performance testing device applied to an industrial robot shown in FIG. 1 is configured to test the static compliance performance in the negative direction of the y axis of the end mechanical interface.

When testing the static compliance performance in the negative direction of the y axis of the end mechanical interface 21 of the industrial robot 20, as shown in FIG. 4, the first fixed pulley 211 is located in the negative direction of the y axis. The second fixed pulley 212 is located below the first fixed pulley 211. The sixth fixed pulley 216 is tangent to the negative direction of the z axis and is located on the side of the z axis close to the second fixed pulley 212. One end of the traction rope 223 loaded in the negative direction of the y axis is connected with the end mechanical interface 21 of the industrial robot 20, and the other end of the traction rope 223 loaded in the negative direction of the y axis is connected with the lever 310 by bypassing the top of the first fixed pulley 211, the bottom of the second fixed pulley 212, and the top of the sixth fixed pulley 216 in order.

Figure 5:
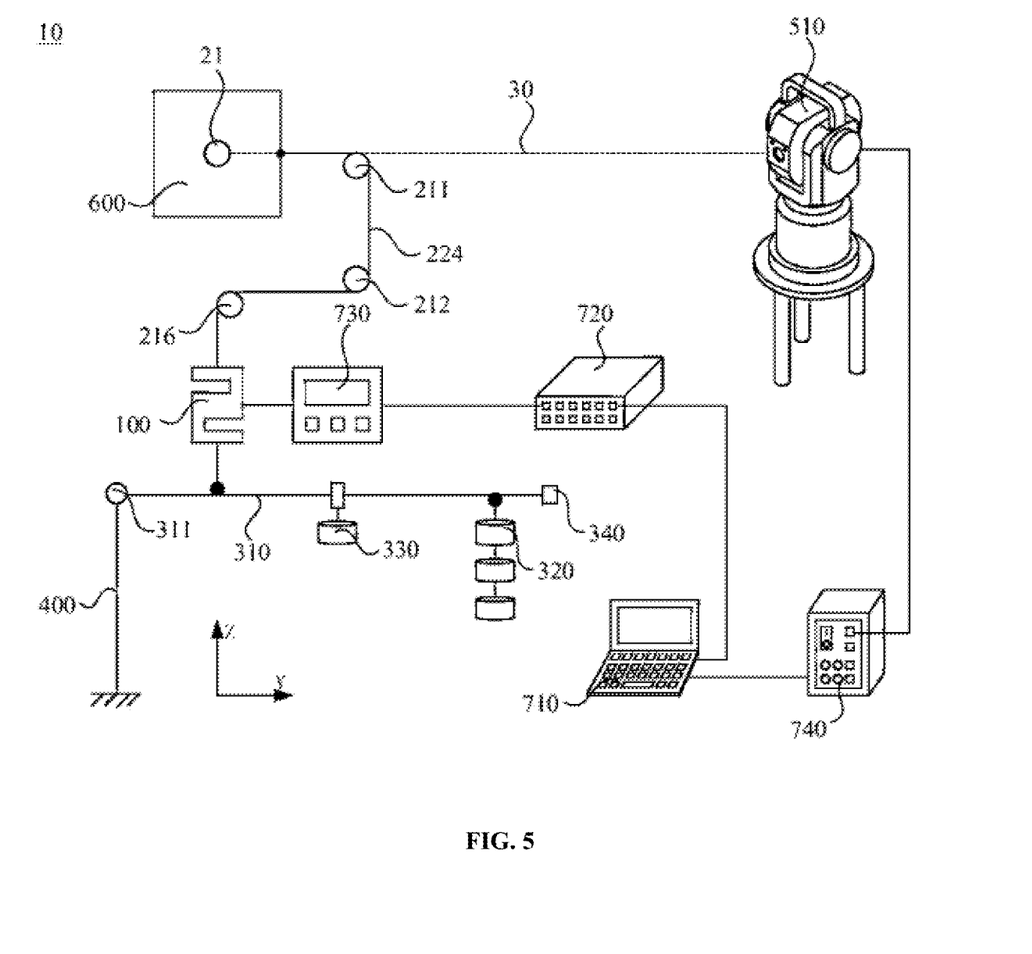
FIG. 5 is a schematic diagram when the static compliance performance testing device applied to an industrial robot shown in FIG. 1 is configured to test the static compliance performance in the positive direction of the y axis of the end mechanical interface.

When testing the static compliance performance in the positive direction of the y axis of the end mechanical interface 21 of the industrial robot 20, as shown in FIG. 5, the first fixed pulley 211 is located in the positive direction of the y axis. The second fixed pulley 212 is located below the first fixed pulley 211. The sixth fixed pulley 216 is tangent to the negative direction of the z axis and is located on the side of the z axis close to the second fixed pulley 212. One end of the traction rope 224 loaded in the positive direction of the y axis is connected with the end mechanical interface 21 of the industrial robot 20, and the other end of the traction rope 224 loaded in the positive direction of the y axis is connected with the lever 310 by bypassing the top of the first fixed pulley 211, the bottom of the second fixed pulley 212, and the top of the sixth fixed pulley 216 in order.

Figure 6:
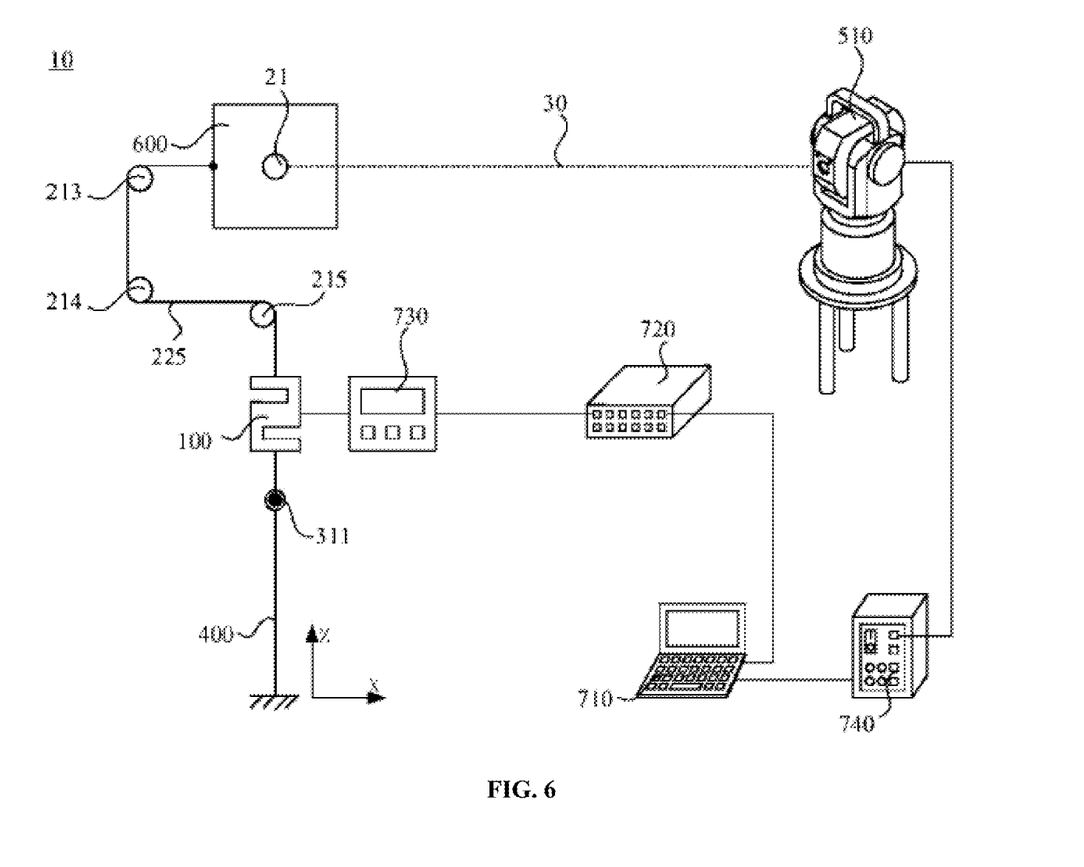
FIG. 6 is a schematic diagram when the static compliance performance testing applied to an industrial robot shown in FIG. 1 is configured to test the static compliance performance in the negative direction of the x axis of the end mechanical interface.

When testing the static compliance performance in the negative direction of the x axis of the end mechanical interface 21 of the industrial robot 20, as shown in FIG. 6, the third fixed pulley 213 is located in the negative direction of the x axis. The fourth fixed pulley 214 is located below the third fixed pulley 213. The fifth fixed pulley 215 is tangent to the negative direction of the z axis and is located on the side of the z axis close to the fourth fixed pulley 214. One end of the traction rope 225 loaded in the negative direction of the x axis is connected with the end mechanical interface 21 of the industrial robot 20, and the other end of the traction rope 225 loaded in the negative direction of the x axis is connected with the lever 310 by bypassing the top of the third fixed pulley 213, the bottom of the fourth fixed pulley 214, and the top of the fifth fixed pulley 215 in order.

Figure 7:
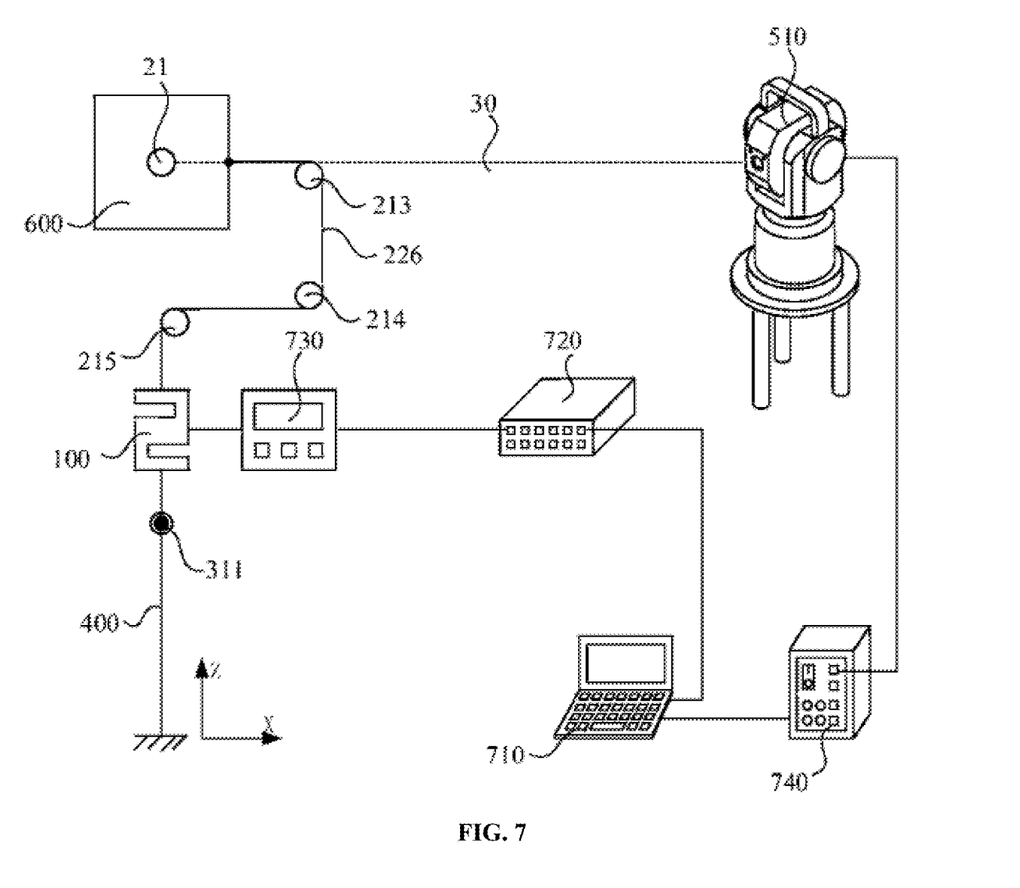
FIG. 7 is a schematic diagram when the static compliance performance testing applied to an industrial robot shown in FIG. 1 is configured to test the static compliance performance in the positive direction of the x axis of the end mechanical interface.

When testing the static compliance performance in the positive direction of the x axis of the end mechanical interface 21 of the industrial robot 20, as shown in FIG. 7, the third fixed pulley 213 is located in the positive direction of the x axis. The fourth fixed pulley 214 is located below the third fixed pulley 213. The fifth fixed pulley 215 is tangent to the negative direction of the z axis and is located on the side of the z axis close to the fourth fixed pulley 214. One end of the traction rope 226 loaded in the positive direction of the x axis is connected with the end mechanical interface 21 of the industrial robot 20, and the other end of the traction rope 226 loaded in the positive direction of the x axis is connected with the lever 310 by bypassing the top of the third fixed pulley 213, the bottom of the fourth fixed pulley 214, and the top of the fifth fixed pulley 215 in order.

In this way, the static compliance performance testing of the end mechanical interface 21 of the industrial robot 20 in six directions in a three-dimensional space can be completed. Of course, in other embodiments, the position of each fixed pulley in the fixed pulley group can also be set according to actual needs.

Specifically, the static compliance performance testing device 10 further comprises a tension sensor 100 and a displacement sensor. The tension sensor 100 is configured to detect the tension received by the force bearing end of the loading direction adjusting component. The displacement sensor is configured to detect the displacement of the end mechanical interface 21 of the industrial robot 20. Optionally, the displacement sensor is a laser tracking sensor. The laser tracking sensor comprises a laser tracker 510 and a laser target. The laser target is provided on the end mechanical interface 21 of the industrial robot 20. The laser tracker 510 is configured to track and collect displacement information of the laser target in real time. Specifically, the laser tracker 510 emits laser light 30. When the laser light 30 is emitted to the laser target, the laser light 30 is reflected back to the laser tracker 510, and the laser tracker 510 obtains displacement information of the laser target. Due to the small divergence of the laser light, a laser tracking sensor is used as the displacement sensor, and the ranging accuracy is high.

Further, the static compliance performance testing device 10 further comprises an end loading cubic head 600, which is fixed at the end mechanical interface 21 of the industrial robot 20. The force applying end of the loading direction adjusting component is connected with the end loading cubic head 600 and is configured to adjust the force bearing direction of the end loading cubic head 600. The displacement sensor is configured to detect the displacement of the end mechanical interface 21 of the industrial robot 20. The laser target is provided on the end loading cubic head 600. The end loading cubic head 600 has a large surface area, which facilitates the connection of the traction rope to the end mechanical interface 21 of the industrial robot 20 and also facilitates the configuration of the target.

Further, the static compliance performance testing device 10 further comprises a data analyzer 710. The data analyzer 710 is electrically connected with the tension sensor 100 and the displacement sensor. The data acquisition analyzer 710 obtains the static compliance performance of the industrial robot 20 through calculation and analysis by receiving the detection result of the tension sensor 100 and the displacement sensor. The data analyzer 710 can collect and summarize the test result of the tension sensor 100 and the displacement sensor, and automatically calculate and analyze to obtain the static compliance performance of the industrial robot 20, thereby saving time for manual calculation and analysis. Optionally, the data analyzer 710 may be a computer, a PLC, or an industrial personal computer with a control board.

Further, the static compliance performance testing device 10 further comprises a tension data acquisition instrument 720. The tension data acquisition instrument 720 is electrically connected with the tension sensor 100 and the data analyzer 710. The tension data acquisition instrument 720 is configured to collect the detection result of the tension sensor 100 and transmit the detection result of the tension sensor 100 to the data analyzer 710. The tension data acquisition instrument 720 can realize the information transfer between the tension sensor 100 and the data analyzer 710.

Further, the static compliance performance testing device 10 further comprises a tension digital display 730 electrically connected with the tension sensor 100, and the tension digital display 730 is configured to display the detection result of the tension sensor 100. This configuration facilitates the operator to monitor the magnitude of the loading force in real time and facilitates the adjustment of the weights at all stages.

Further, the static compliance performance testing device 10 further comprises a displacement sensing controller 740, which is electrically connected with the displacement sensor and the data analyzer 710. The displacement sensing controller 740 is configured to control the operation of the displacement sensor. The displacement sensing controller 740 is further configured to collect the detection result of the displacement sensor and transmit the detection result of the displacement sensor to the data analyzer 710. The displacement sensing controller 740 can realize automatic control of the operation of the displacement sensor, and can realize the information transfer between the displacement sensor and the data analyzer 710. In the present embodiment, the displacement sensing controller 740 is a laser tracking controller.

The above static compliance performance testing device 10 has at least the following advantages.

The loading direction adjusting component can adjust the force bearing direction of the end mechanical interface 21 of the industrial robot 20. The loading force adjusting component can adjust the force bearing magnitude of the end mechanical interface 21 of the industrial robot 20, thereby controlling the force bearing magnitude of the end mechanical port of the industrial robot 20. The loading force adjusting component mainly adjusts the magnitude of the loading force through a first-stage weight 320 and a second-stage weight 330 on a lever 310 connected with the force bearing end of the loading direction adjusting component. The weight of the first-stage weight 320 is greater than that of the second-stage weight 330. The loading force can be adjusted initially by increasing or decreasing the number of the first-stage weights 320, and the loading force can be further precisely adjusted by increasing or decreasing the number of the second-stage weights 330 or changing the position of the second-stage weight 330 on the lever 310. The static compliance performance testing device 10 has a simple structure and low cost, and controls the loading force without using a complex servo motor or an oil cylinder. In addition, it is more convenient to operate the static compliance performance testing device 10 when adjusting the direction and magnitude of the loading force.

The technical features of the above embodiments can be arbitrarily combined. In order to make the description concise, all possible combinations of the technical features in the above embodiments have not been described. However, as long as there is no contradiction in the combination of these technical features, it should be considered to be the range described in this specification.

The above embodiments only express several implementations of the present invention, and the description thereof is more specific and detailed, but cannot be understood as a limitation on the patent scope of the present invention. It should be noted that those of ordinary skill in the art can make several modifications and improvements, which all belong to the protection scope of the present invention, without departing from the concept of the present invention. Therefore, the patent protection scope of the present invention shall be subject to the appended claims.

What is claimed is:

1. A static compliance performance testing device applied to an industrial robot, comprising: a loading direction adjusting component, the force applying end of which is connected with an end mechanical interface of the industrial robot and is configured to adjust a force bearing direction of the end mechanical interface of the industrial robot; and a loading force adjusting component, comprising a lever, a first-stage weight and a second-stage weight, wherein the lever is provided with a fixing part and is rotatable around the fixing part, the force bearing end of the loading direction adjusting component is connected with the lever, the first-stage weight is suspended on the lever, the second-stage weight is suspended on the lever and is movable along the lever, the weight of the first-stage weight is larger than the weight of the second-stage weight, and the first-stage weight and the second-stage weight are both located on one side of the force bearing end of the loading direction adjusting component.

2. The static compliance performance testing device applied to an industrial robot according to claim 1, further comprising an end loading cubic head, wherein the end loading cubic head is fixed at the end mechanical interface of the robot, and the force applying end of the loading direction adjusting component is connected with the end loading cubic head and is configured to adjust the force bearing direction of the end loading cubic head.

3. The static compliance performance testing applied to an industrial robot according to claim 2, further comprising a tension sensor and a displacement sensor, wherein the tension sensor is configured to detect the tension received by the force bearing end of the loading direction adjusting component, and the displacement sensor is configured to detect the displacement of the end mechanical interface of the industrial robot.

4. The static compliance performance testing applied to an industrial robot according to claim 3, wherein the displacement sensor is a laser tracking sensor, the laser tracking sensor comprises a laser tracker and a laser target, and the laser target is provided on the end mechanical interface of the industrial robot, and the laser tracker is configured to track and collect the displacement information of the laser target in real time.

5. The static compliance performance testing device applied to an industrial robot according to claim 3, further comprising a data analyzer, wherein the data analyzer is electrically connected with the tension sensor and the displacement sensor, and the data analyzer obtains the static compliance performance of the industrial robot through calculation and analysis by receiving the detection result of the tension sensor and the displacement sensor.

6. The static compliance performance testing device applied to an industrial robot according to claim 1, wherein the loading force adjusting component further comprises a third-stage weight, the third-stage weight is sleeved on the lever and is movable along the lever, the weight of the third-stage weight is smaller than that of the second-stage weight, and the first-stage weight, the second-stage weight, and the third-stage weight are all located on one side of the force bearing end of the loading direction adjusting component.

7. The static compliance performance testing applied to an industrial robot according to claim 6, further comprising a tension sensor and a displacement sensor wherein the tension sensor is configured to detect the tension received by the force bearing end of the loading direction adjusting component, and the displacement sensor is configured to detect the displacement of the end mechanical interface of the industrial robot.

8. The static compliance performance testing applied to an industrial robot according to claim 7, wherein the displacement sensor is a laser tracking sensor, the laser tracking sensor comprises a laser tracker and a laser target, and the laser target is provided on the end mechanical interface of the industrial robot, and the laser tracker is configured to track and collect the displacement information of the laser target in real time.

9. The static compliance performance testing device applied to an industrial robot according to claim 7, further comprising a data analyzer, wherein the data analyzer is electrically connected with the tension sensor and the displacement sensor, and the data analyzer obtains the static compliance performance of the industrial robot through calculation and analysis by receiving the detection result of the tension sensor and the displacement sensor.

10. The static compliance performance testing device applied to an industrial robot according to claim 1, wherein the loading direction adjusting component comprises a traction rope and a fixed pulley group, the fixed pulley group comprises at least four fixed pulleys, one end of the traction rope is connected with the end mechanical interface of the industrial robot, and the other end of the traction rope is connected with the lever by bypassing the fixed pulley or the other end of the traction rope is directly connected with the lever, and the force bearing direction of the end mechanical interface of the industrial robot is changeable by changing the fixing position of the fixed pulley.

11. The static compliance performance testing device applied to an industrial robot according to claim 10, wherein an xyz coordinate system is established with a geometric center of an end mechanical interface of the industrial robot as an origin, the fixed pulley group comprises six fixed pulleys, which are the first fixed pulley, the second fixed pulley, the third fixed pulley, the fourth fixed pulley, the fifth fixed pulley, and the sixth fixed pulley, respectively, the center line connecting the first fixed pulley and the second fixed pulley is parallel to the z axis and located in a plane defined by the z axis and the y axis; the center line connecting the third fixed pulley and the fourth fixed pulley is parallel to the z axis and located in a plane defined by the z axis and the x axis; the fifth fixed pulley and the sixth fixed pulley are both tangent to the z axis and are located on both sides of the end mechanical interface of the industrial robot, respectively, or the fifth fixed pulley and the sixth fixed pulley are both located below the end mechanical interface of the industrial robot and the fifth fixed pulley and the sixth fixed pulley are both tangent to the negative direction of the z axis.

12. The static compliance performance testing applied to an industrial robot according to claim 11, further comprising a tension sensor and a displacement sensor, wherein the tension sensor is configured to detect the tension received by the force bearing end of the loading direction adjusting component, and the displacement sensor is configured to detect the displacement of the end mechanical interface of the industrial robot.

13. The static compliance performance testing applied to an industrial robot according to claim 12, wherein the displacement sensor is a laser tracking sensor, the laser tracking sensor comprises a laser tracker and a laser target, and the laser target is provided on the end mechanical interface of the industrial robot, and the laser tracker is configured to track and collect the displacement information of the laser target in real time.

14. The static compliance performance testing applied to an industrial robot according to claim 10, further comprising a tension sensor and a displacement sensor, wherein the tension sensor is configured to detect the tension received by the force bearing end of the loading direction adjusting component, and the displacement sensor is configured to detect the displacement of the end mechanical interface of the industrial robot.

15. The static compliance performance testing applied to an industrial robot according to claim 14, wherein the displacement sensor is a laser tracking sensor, the laser tracking sensor comprises a laser tracker and a laser target, and the laser target is provided on the end mechanical interface of the industrial robot, and the laser tracker is configured to track and collect the displacement information of the laser target in real time.

16. The static compliance performance testing applied to an industrial robot according to claim 1, further comprising a tension sensor and a displacement sensor, wherein the tension sensor is configured to detect the tension received by the force bearing end of the loading direction adjusting component, and the displacement sensor is configured to detect the displacement of the end mechanical interface of the industrial robot.

17. The static compliance performance testing applied to an industrial robot according to claim 16, wherein the displacement sensor is a laser tracking sensor, the laser tracking sensor comprises a laser tracker and a laser target, and the laser target is provided on the end mechanical interface of the industrial robot, and the laser tracker is configured to track and collect the displacement information of the laser target in real time.

18. The static compliance performance testing device applied to an industrial robot according to claim 16, further comprising a data analyzer, wherein the data analyzer is electrically connected with the tension sensor and the displacement sensor, and the data analyzer obtains the static compliance performance of the industrial robot through calculation and analysis by receiving the detection result of the tension sensor and the displacement sensor.

19. The static compliance performance testing device applied to an industrial robot according to claim 18, further comprising a tension data acquisition instrument, wherein the tension data acquisition instrument is electrically connected with the tension sensor and the data analyzer, and the tension data acquisition instrument is configured to collect the detection result of the tension sensor and transmit the detection result of the tension sensor to the data analyzer.

20. The static compliance performance testing device applied to an industrial robot according to claim 18, further comprising a displacement sensing controller, wherein the displacement sensing controller is electrically connected with the displacement sensor and the data analyzer, the displacement sensor controller is configured to control the operation of the displacement sensor, and the displacement sensor controller is further configured to collect the detection result of the displacement sensor and transmit the detection result of the displacement sensor to the data analyzer.

* * * * *